(No Model.)
J. A. CARR.
GRAIN DRILL.
No. 269,007.
Patented Dec. 12, 1882.
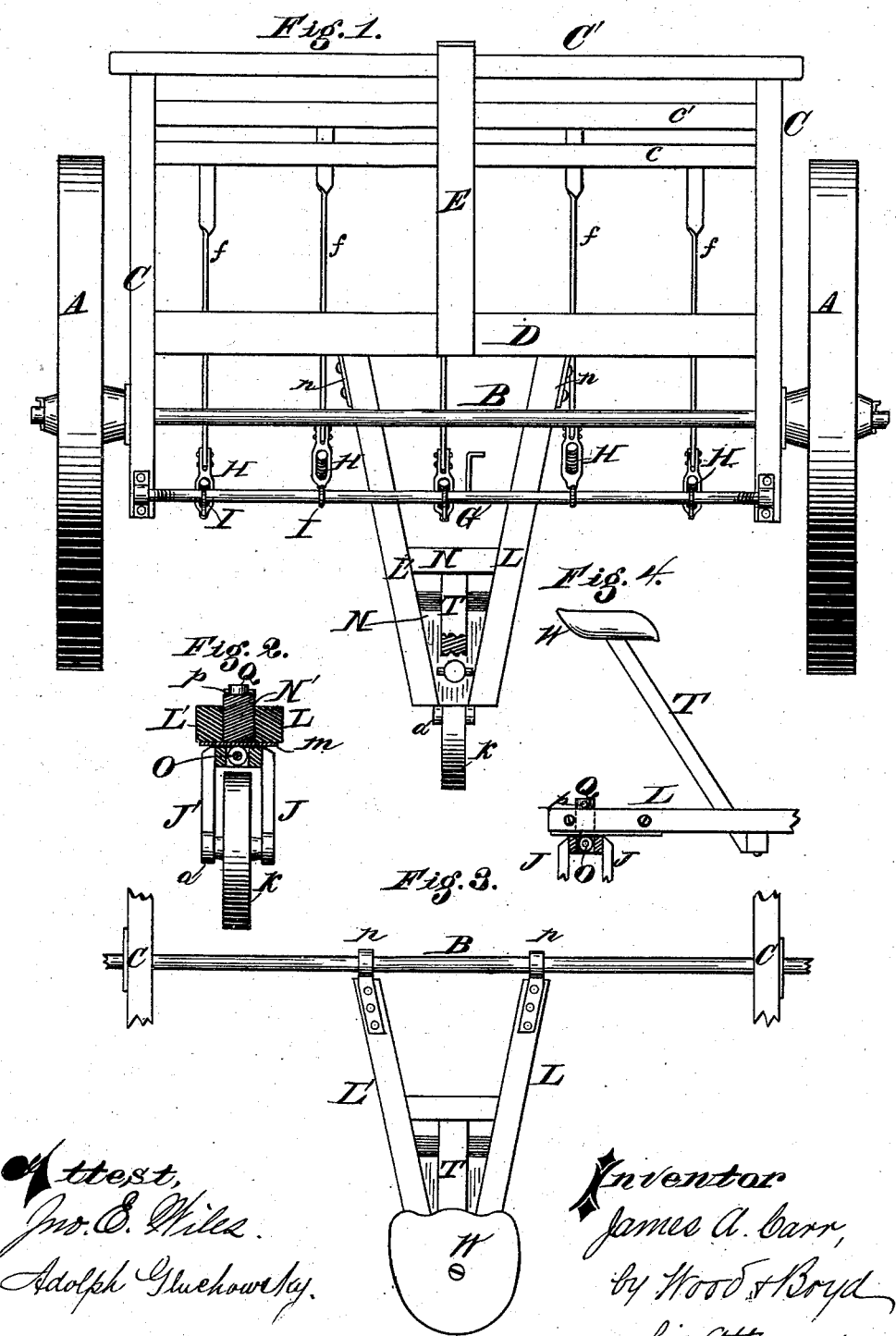
Attest,
Jno. E. Wiles.
Adolph Gluchowsky.
Inventor
James A. Carr,
by Wood & Boyd
his Attorneys &c

UNITED STATES PATENT OFFICE.

JAMES A. CARR, OF RICHMOND, INDIANA.

GRAIN-DRILL.

SPECIFICATION forming part of Letters Patent No. 269,007, dated December 12, 1882.

Application filed July 15, 1882. (No model.)

*To all whom it may concern:*

Be it known that I, JAMES A. CARR, a citizen of the United States, and a resident of Richmond, in the county of Wayne and State of Indiana, have invented certain new and useful Improvements in Grain-Drills, of which the following is a specification.

My invention relates to an improvement in grain-drills, and to that class which employ a seat for the driver and operator.

Hitherto grain-drills which employ a driver's seat mount the same upon the main frame, either in front or in rear of the seed-box, or independent thereof. In either case the weight of the driver affects the balance of the machine, and, if balanced so as to operate with the driver on the machine, when he walks, the machine is out of balance; but in any event, the machine being upon but two wheels and necessarily using a stiff tongue, the movements of the machine over uneven ground and the varying position of the driver's body cause a rocking motion, owing to the constant change of the weight and balance.

My invention overcomes these difficulties, and will be explained in connection with the accompanying drawings, in which—

Figure 1 is a plan view of my improvement with the seat removed. Fig. 2 is a section on line *x x*, Fig. 1, partly in elevation. Fig. 3 shows a modified form of hinging the riding-frame. Fig. 4 is a sectional elevation of the seat and frame.

A A represent the supporting-wheels; B, the axle; C C', the main frame on which the seed-box is mounted.

*c c'* represent the cross-bars, to which the drag-bars are attached. They may be made to shift forward and back to shift the line of the hoes in any well-known manner. These bars also may be made to adjust vertically to regulate the depth of the hoes.

D represents the rearmost cross-bar of the main frame; E, the tongue attached to said frame.

*f* represents the drag-bars; H, the hoes, and I the ring of the chains, which usually pass through staples in the lifting-roller G to suspend the hoes and allow of their being lifted either singly or in unison. These features are generally old, my invention being adapted to be used in connection with them or with any other equivalent devices common to grain-drills.

L L' N N' represent the frame of a riding or driver's seat, hinged at the forward end to the main frame of any ordinary grain-drill, and supported at the rear upon a caster-wheel. Fig. 1 shows the seat-frame hinged to cross-bar D, and Fig. 3 shows the same hinged upon the shaft or axle B, and are equivalent modes of hinging this riding-frame. Fig. 2 shows the preferred form of attaching the caster-wheel K to the seat-frame.

J J' represent a forked hanger; *a*, an axle journaled thereto, and on which axle is keyed the caster-wheel K.

Q represents a stud rigidly connected to the forks J J', projecting up through and journaling in the frame-piece N', so as to allow the caster-wheel K to swivel in the seat-frame.

M represents a metal plate attached upon the under side of seat-frame. *o* represents a friction-roller journaled upon stud Q, and with its periphery or tread in frictional contact with the face of plate M, so as to allow the caster-wheel K to swivel freely whenever the grain-drill is turned to the right or left.

I do not wish to confine myself to the V-shaped form of frame for the driver's seat, as it may be made of parallelogram form; but the form here shown I deem the simplest. The location of the driver's seat upon the frame is such as to bring the weight nearly over the wheel K, so that it will principally sustain the weight of the attendant. This is not important when the riding-frame is hinged to the axle, as shown in Fig. 3. The location of the driver's seat is such that he can readily control the lifting-roller G or easily reach the rings I of the chains of the individual drag-bars *f*.

*n n* represent hinges for connecting the riding-frame to the main frame. Any well-known form of hinge may be used.

Instead of a single supporting-wheel swiveled to the riding-frame, two supporting-wheels swiveled to the riding-frame may be employed, and will operate measurably well, and would be an equivalent to the single caster-wheel; but the single wheel is the cheapest, and answers all purposes of my invention. So, instead of one anti-friction roller *o*, two or more may be provided, and the mode of arrangement may be variously modified to carry out the objects of my invention.

A grain-drill has heretofore been provided with a riding-frame having a hinged connection with the drill-frame, and supported by a roller which is mounted on a horizontal shaft having its end bearings in the riding-frame; but such is not my invention, and is not claimed by me. A wheeled plow has also been provided with a riding-frame rigidly attached to the front bolster of the frame, and provided at its rear with a wheel mounted in a hanger which is pivoted to the riding-frame; but neither is such my invention or claimed by me. The front support of a seeding-machine has also been composed of a caster-wheel the hanger of which carries a friction-roller on which rests a circular plate attached to the forward end of the machine-frame; but neither is such my invention or claimed by me.

I claim—

1. In combination with the independent hoes of a grain-drill, a riding-frame hinged at its forward end to the main frame of the drill, and supported at its rear end by a swiveling wheel-support, substantially as herein set forth.

2. In combination with a series of independent grain-drill hoes, a riding-frame supporting a driver's seat, located in rear of the lifting-roller and in close proximity thereto, said riding-frame being hinged to and supported by a swiveling wheel-support, substantially as herein set forth.

3. In combination with the series of independent drag-bars, the riding-frame hinged to the main frame of the drill, and the caster-wheel spindle journaled to the rear end of the riding-frame, substantially as herein set forth.

In testimony whereof I have hereunto set my hand in the presence of two subscribing witnesses.

JAMES A. CARR.

Witnesses:
H. G. JOHNSTON,
ALVIN E. CROCKER.